United States Patent [19]

Kim

[11] Patent Number: 5,240,239

[45] Date of Patent: Aug. 31, 1993

[54] PAPER SHEET FEEDING APPARATUS

[75] Inventor: Hyoung-Chae Kim, Ahnyang, Rep. of Korea

[73] Assignee: Samsung Electronics Co., Ltd., Suwon, Rep. of Korea

[21] Appl. No.: 813,604

[22] Filed: Dec. 26, 1991

[30] Foreign Application Priority Data

Sep. 25, 1991 [KR] Rep. of Korea .................. 16680

[51] Int. Cl.[5] .......................... B65H 5/06; B65H 3/06
[52] U.S. Cl. ....................................... 271/10; 271/116
[58] Field of Search ................ 271/10, 12, 114, 116, 271/267, 268, 272; 400/551, 636.2, 637.1, 659

[56] References Cited

U.S. PATENT DOCUMENTS

| 4,589,646 | 5/1986 | Ozawa et al. | 271/10 |
| 5,116,038 | 5/1992 | Kim | 271/10 |

FOREIGN PATENT DOCUMENTS

| 197543 | 10/1985 | Japan | 271/10 |
| 176234 | 7/1988 | Japan | 271/116 |

OTHER PUBLICATIONS

W. Goff, Jr. "Drive Mechanism", *IBM Technical Discl. Bulletin*, vol. 17, No. 5, pp. 1301-1302 (Oct. 1974).

*Primary Examiner*—Robert P. Olszewski
*Assistant Examiner*—Steven M. Reiss
*Attorney, Agent, or Firm*—Robert E. Bushnell

[57] ABSTRACT

The present invention describes an automatic paper sheet feeding apparatus for automatically feeding a number of paper sheets one by one at regular intervals. A cylindrical bushing 10 inserted in and fixed at a automatic paper sheet feed roller shaft 3 has a detent part 10b and an elastic piece 10a allowing elastic motion to a direction of the paper sheet feed roller shaft 3. A cylindrical part 20a united with an automatic paper sheet feed gear 20 has an elastic piece 20b allowing elastic motion in the paper sheet feed roller shaft 3 direction and confronted with the elastic piece 10a of the bushing 10. The automatic paper sheet feed roller shaft 3 is inserted into the automatic paper sheet feed gear 20 through the bushing 10 so that the automatic paper sheet feed gear 20 can rotate. The elastic piece 20b of the automatic paper sheet feed gear 20 is engaged with the detent part 10b of the bushing 10, so that the automatic paper sheet feeding operation is performed. That is, because the transmitting operation is reliably carried out without a spring clutch, the number of parts as well as the cost are decreased, and the apparatus is simplified.

4 Claims, 4 Drawing Sheets

PAPER SHEET FEEDING APPARATUS

BACKGROUND OF THE INVENTION

The present invention relates to a paper sheet feeding apparatus, and particularly, although not exclusively, to the paper sheet feeding apparatus capable of feeding a stack of paper sheets into a paper sheet receiving part automatically and accurately one by one at regular intervals in a copying transmitting machine such as a facsimile machine or a photocopier.

Generally, if a transmitting signal is generated when a number of paper sheets are set in a paper sheet supply part, the paper sheet feeding apparatus of the copying transmitting machine begins to feed paper sheets from the lowest paper sheet one by one in order and transmits wanted information by scanning images of fed paper sheet.

Conventionally, in order to successively feed a number of paper sheets one by one, a device shown in FIG. 1 is used. A cylindrical automatic paper sheet feed roller 2, for feeding the paper sheets 1 set in a paper sheet supply part from a front edge of the paper sheet, is fixed at a middle of the paper sheet feed roller shaft 3 of the automatic paper sheet feed roller 2, and the paper sheet feed roller shaft 3 is supported at a frame 4 to be rotated. The paper sheet feed rubber 21 is selectively contacted with paper sheet feed roller 2 by a spring 22. An end of the paper sheet feed roller shaft 3 is got in a cylindrical part 5a of a bushing 5 to be fixed. A cylindrical part 7a of an automatic paper sheet feed gear 7 and the cylindrical part 5a of a blushing 5 are inserted into a clutch spring 6, the clutch spring 6 blocking or transferring a power applied to the paper sheet feed gear 7 from a motor ( not figured ) to the paper sheet feed roller 2.

A cylindrical transfer roller 8 which is positioned in paralleled with the automatic paper sheet feed roller 2 and transmits the paper sheets, is fixed at the middle of a transfer roller shaft 9 of the transfer roller 8, and the transfer roller shaft 9 is supported at the frame 4 to be rotated. A pinch roller 11 applying pressure to the transfer roller 8 is supported at another frame during the transferring of the paper sheet. A transfer gear 8a is fixed at an end of the transfer roller shaft 9 adjacent to the frame 4, delivering rotary power from the outside to the transfer roller 8.

If the paper sheet 1 is fed to the automatic paper sheet feed roller 2, the paper sheet feed gear 7 and transfer gear 8a turn in a direction of A. Accordingly, as shown in FIG. 3B, since the clutch spring 6 put between the cylindrical part 7a of the automatic paper sheet feed gear 7 and the cylindrical part 5a of the bushing 5, is compressed to a rotatable direction. The power applied to the automatic paper sheet feed gear 7 is transmitted, through the clutch spring 6 and the bushing 5, from the outside to the paper sheet feed roller shaft 3, thereby turning the paper sheet feed roller shaft 3 to the direction of A. By this rotation, the paper sheet 1 is transferred from the automatic paper sheet feed roller 2 to the transfer roller 8, as a paper sheet reader 23 begins to read the paper sheet from the front edge thereof. Next, the paper sheet 1 is introduced between a pinch roller 11 and the transfer roller 8 by a friction force, and then transferred with tension forced, which is caused by the fact the linear velocity of the automatic paper sheet feed roller 2 is slower than that of the transfer roller 8.

As the paper sheet 1 is transferred, the liner velocity of the paper sheet feed roller 2 approaches the linear velocity of the transfer roller 8. Between the rotary bushing 5 joined with the paper sheet feed roller shaft 3 and the automatic paper sheet feed gear 7 of a constant velocity is generated a phase traveling difference $\Delta Q$ which is proportional to the length of the paper sheet 1. This phase traveling difference $\Delta Q$ is caused by the velocity difference between the automatic paper sheet feed roller 2 and the automatic paper sheet feed gear 7. As a result, as shown in FIG. 3A, the compressed spring clutch 6 comes to loose gradually, forming a gap $\Delta g$ between the outer circumferences of the cylindrical parts 5a and 7a and the inside circumference of the clutch spring 6, so that the automatic paper sheet feed roller 2 comes to turn at the same velocity with the linear velocity of the transfer roller 8.

On the other hand, if a back edge of the paper sheet 1 slips out of the automatic paper sheet feed roller 2, as shown in FIG. 3B, the automatic paper sheet feed gear 7 turns to the direction of A as much as the phase traveling difference, so that the clutch spring 6 surrounding the cylindrical part 7a of the automatic paper sheet feed gear 7 and the cylindrical part 5a of the bushing 5, is compressed toward the A-direction. The paper sheet feed gear 6 turns to the A-direction along with the paper sheet feed roller shaft 3. Thereby, the power from the exterior is delivered to the paper sheet feed roller shaft 3 of the automatic paper sheet feed roller 2 through the bushing 5, then the next paper sheet is supplied to the automatic paper sheet feed roller 2. That is, the phase traveling difference between bushing 5 and the paper sheet feed gear 7 makes a feed interval between the front edge of the paper sheet 1 and the back edge of the paper sheet, thus enabling the paper sheets to be fed one by one.

Accordingly, in the conventional paper sheet feed apparatus, in order to achieve the above-described operation, that is a role for blocking or transferring the external power of the automatic paper sheet feed gear 7 to the bushing 5, the clutch spring 6 must be delicately assembled so as to provide very small gap between the clutch spring 6 and the cylindrical parts 5a and 7a. As the assembling of such a clutch spring is not easy, however, an expert for assembling the clutch spring is needed, and moreover, using of the clutch spring brings about the raising of the cost.

SUMMARY OF THE INVENTION

Therefore, it is an object of the present invention to provide an automatic paper sheet feeding apparatus which can retrench cost and simplify assembling thereof by decreasing parts of the apparatus in number.

In accordance with the present invention, an apparatus for feeding a stack of paper sheets one by one and having a paper sheet feed roller shaft, paper sheet feed roller receiving the paper sheet and circumferentially mounted on the paper sheet feed roller shaft, and transfer roller receiving the paper sheet from the paper sheet feed roller and positioned apart from and in parallel with the paper sheet feed roller, the apparatus including paper sheet feed gear mounted on the paper sheet feed roller shaft, wherein the paper sheet feed gear has a cylindrical part positioned toward the paper sheet feed roller shaft, and the cylindrical part has a first elastic piece formed at an end thereof, the first elastic piece being movable in a direction of the paper sheet feed roller shaft; and a bushing mounted between the cylindrical part and the paper sheet feed roller and on the paper sheet feed roller shaft, and having a detent part positioned at an end thereof and a second elastic piece adjacent to the detent part, the second elastic piece moving against the first elastic piece.

BRIEF DESCRIPTION OF THE DRAWINGS

For a better understanding of the invention and to show how the same way may be carried into effect, reference will now be made, by way of example, to the accompanying drawings, in which.

DETAILED DESCRIPTION OF THE PREFERRED EMBODIMENT

Figure 1:
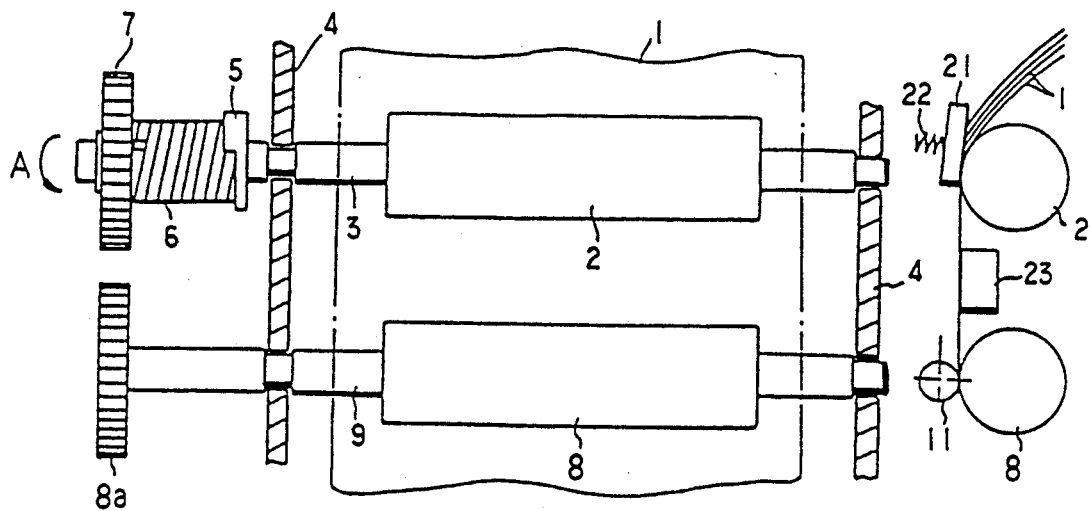
FIG. 1 is a plan view of the conventional automatic paper sheet feeding apparatus.
Figure 2:
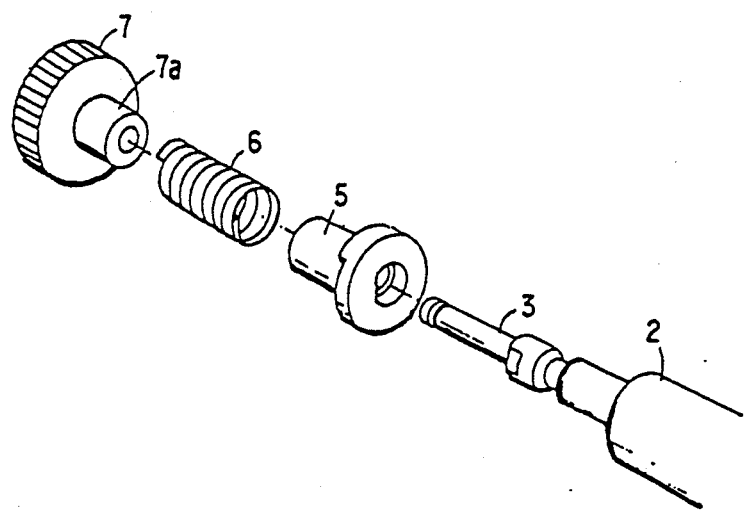
FIG. 2 is a separated-perspective view of the essential parts of the conventional automatic paper sheet feeding apparatus.
Figure 3A:
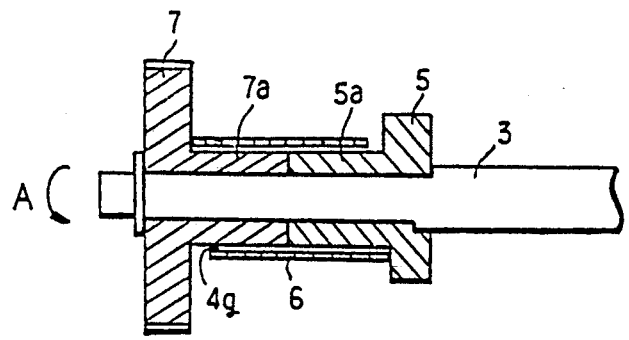
FIG. 3A is a cross-sectional view of the assembled essential parts of the conventional automatic paper sheet feeding apparatus.
Figure 3B:
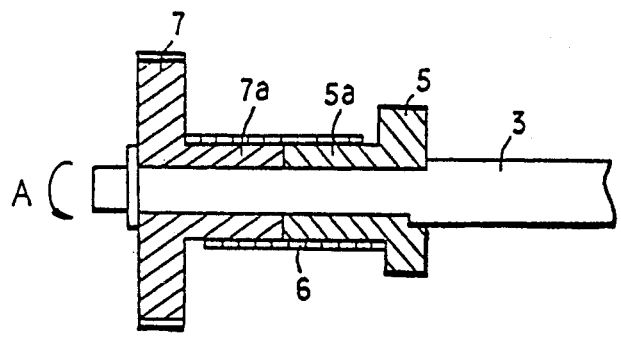
FIG. 3B is an operating diagram of the clutch spring for operating the conventional paper sheet feed roller.
Figure 4:
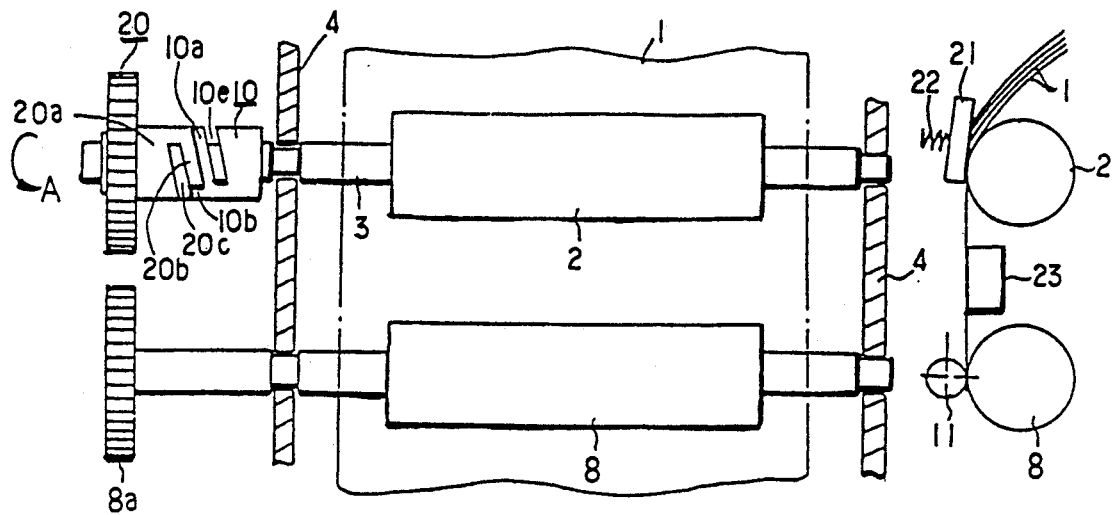
FIG. 4 is a plan view of the automatic paper sheet feeding apparatus according to the present invention.
Figure 5:
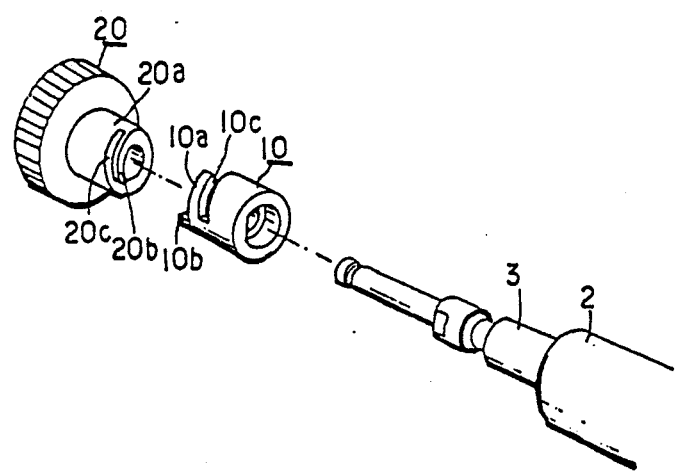
FIG. 5 is a separated-perspective view of the essential parts of the automatic paper sheet feeding apparatus according to the present invention.

With reference to FIG. 4 and FIG. 5, the construction of the present invention will be described.

The paper sheet feed roller shaft 3 of the automatic paper sheet feed roller 2 is supported to the frame 4, feeding a number of paper sheets 1 in a paper sheet supplying part to the paper sheet receiving part. The paper sheet feed roller shaft 3 is connected to and inserted into the bushing 10 so as to rotate along with the paper sheet feed shaft 3. A detent part 10b is positioned in an end of the bushing 10, and a groove 10c is formed in middle portion of the bushing 10 with a given length, so that an elastic piece 10a is positioned between the detent part 10b and the groove 10c. A cylindrical part 20a of an automatic paper sheet feed gear 20 has an elastic piece 20b and a groove 20c. The elastic piece 20b is positioned in an end of the cylindrical part 20a. The groove 20b is formed adjacent to the elastic piece 20b. The elastic piece 20b of the automatic paper sheet feed gear 20 is engaged with the detent part 10b in the bushing 10 assembled with the paper sheet feed roller shaft 3, delivering the exterior power to the paper sheet feed roller shaft 3 through the bushing 10. The transfer roller 8 is positioned in parallel with the automatic paper sheet feed roller 2. The elastic pieces 10a, 20b are inclined at the same gradient, so that as the transfer roller 8 rotates more rapidly, power of the automatic paper sheet feed gear 20 is not transmitted to the paper sheet feed roller shaft 3, rotating the automatic paper sheet feed roller 2 at the same velocity with the transfer roller 8. A width of detent part 10b of the bushing 10, widths of the elastic pieces 10a and 20b, and the widths of the grooves 10c and 20c are the same. The leftmost portions of the elastic piece 10a and the leftmost of the detent part 10b are vertically aligned. The right side of the elastic piece 20b of the cylindrical part 20a is formed so as to slide onto the left side of the elastic piece 10a of the bushing 10.

The operational effect of the present invention will now be described.

If the paper sheet 1 delivers to the automatic paper sheet feed roller 2 which is in contact with the paper sheet feed rubber 21 by the spring 21, power from a motor (not figured) is applied to the automatic paper sheet feed gear 20, turning the paper sheet feed gear 20 to the A-direction. The elastic piece 20b formed on the cylindrical part 20a of the automatic paper sheet feed gear 20 slides with the elastic piece 10a of the bushing 10, pushes the detent part 10b, and turns to the A-direction.

Then, power of the paper sheet feed gear 20 delivers to the bushing 10, turning the automatic paper sheet feed roller 2 to the A-direction, transmitting the paper sheet 1 to the transfer roller 8 by the friction force between the paper sheet feed roller and the paper sheet feed rubber 21, as being read by the paper sheet reader 23 from the front edge of the paper sheet. The front edge of the paper sheet 1 is put between the transfer roller 8 and the pinch roller 11, and the paper sheet 1 under the tension is transmitted, which is caused by the fact the linear velocity of the transfer roller 8 is faster than that of the automatic paper sheet feed roller 2.

Figure 6A:
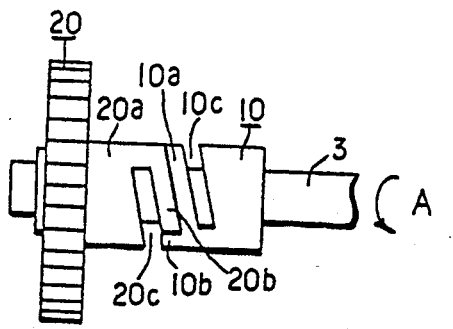
FIGS. 6A-6C are operating diagrams of the paper sheet feeding apparatus according to the present invention.
Figure 6B:
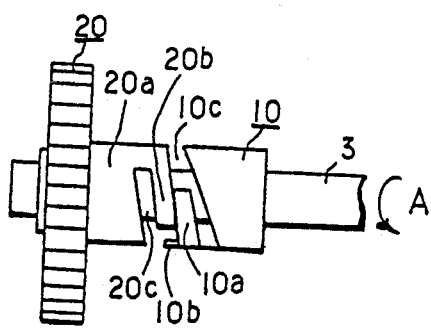
Figure 6C:
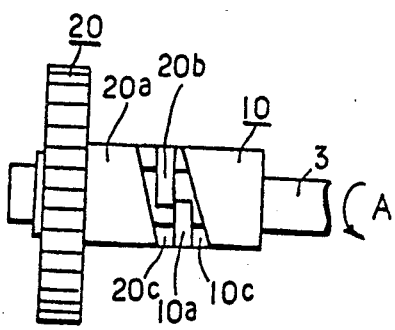

As the paper sheet 1 is transferred, the linear velocity of the paper sheet feed roller 2 approaches the linear velocity of the transfer roller 8. At this time, between the bushing 10 rotating together with the paper sheet feed roller shaft 3 and the automatic paper sheet feed gear 20 rotating at a constant, velocity generates the phase traveling difference, which is proportional to the length of the paper sheet 1. The elastic piece 20b on the cylindrical part 20a of the automatic paper sheet feed gear 20 slides on the elastic piece 10a of the bushing 10, as shown in FIG. 6B, rotating each other under the tension. Accordingly the gap between the detent part 10b on the cylindrical part of the bushing 10 and the lowest of the elastic piece 20b formed on the cylindrical part 20a of the automatic paper sheet feed gear 20, is widened gradually. The automatic paper sheet feed gear 20 moves faster than the automatic paper sheet feed roller 2. Then, as shown in FIG. 6C, the elastic piece 20b on the cylindrical part 20a and the elastic piece 10a of the bushing are pushed into the grooves 10c and 20c respectively by the tension thereof. Thereupon, the automatic paper sheet feed roller 2 rotates faster than the automatic paper sheet feed gear 20, and the linear velocity of the automatic paper sheet feed roller 2 becomes the same as that of the transfer roller 8, transmitting the paper sheet 1.

At this time, since power of the automatic paper sheet feed gear 20 is not delivered to the paper sheet feed roller shaft 3, even if the paper sheet is the very long, paper sheet can be transmitted by the above-described operation.

On the other hand, if the back edge of the paper sheet 1 slips out of the automatic paper sheet feed roller 2, the elastic piece 20b on the cylindrical part 20a of the automatic paper sheet feed gear 20, the paper sheet feed gear 20 rotating at the constant velocity, slides on the elastic piece 10a of the bushing 10 connected to the paper sheet feed roller shaft 3, under the state that the power is not delivered. While sliding, the elastic piece 20b pushes the detent part 10b of the bushing 10. Thereupon, power of the automatic paper sheet feed gear 20 is delivered to the bushing 10, turning the automatic paper sheet feed roller 2. Thereafter, the operation for feeding subsequent paper sheet is performed by the automatic paper sheet feed roller 2.

As described above, the phase traveling difference ΔQ generates a feed interval between the back edge of the preceding paper sheet and the front edge of subsequent paper sheet, so that the paper sheets are fed one by one.

As described hereinabove, according to the present invention, paper sheet feeding operation is done as keeping the feed interval between the paper sheets automatically by using the elastic piece on the cylindrical part of the automatic paper sheet feed gear and the elastic piece of the bushing, and even the irregular paper sheet can be automatically fed and transmitted without problem.

Moreover, since the paper sheet feeding operation and the paper sheet transmitting operation are reliably carried out without the spring clutch, the problem caused by the spring clutch is solved, and the cost is decreased.

While the present invention has been particularly shown and described with reference to the preferred specific embodiment thereof, it will be apparent to those who skilled in the art that the foregoing changes in form and detail may be made without departing from the spirit and scope of the present invention.

What is claimed is:

1. An apparatus for feeding a stack of paper sheets in a regular interval, comprising:
    a driving shaft;
    paper sheet feed roller means receiving the paper sheet and circumferentially mounted on said driving shaft;
    transfer roller means receiving said paper sheet from said paper sheet feed roller means and positioned apart from and parallel with said paper sheet roller means;
    paper sheet feed gear means mounted on said driving shaft, wherein said paper sheet feed gear means has a cylindrical part positioned toward said driving shaft, and said cylindrical part has a first elastic piece formed at an end thereof, said first elastic piece being movable in a direction of said driving shaft;
    a bushing circumferentially mounted between said cylindrical part and said paper sheet feed roller means and on said driving shaft, and having detent means positioned at an end thereof and a second elastic piece adjacent to said detent means, said second elastic piece moving against said first elastic piece; and
    whereby said first elastic piece slides against said second elastic piece until said second elastic piece pushes said detent means, transmitting said paper sheet from said paper sheet feed roller means to said transfer roller means.

2. An apparatus as claimed in claim 1, wherein said first elastic piece and said second elastic piece are confronted with each other and inclined in same gradient, so that said two elastic pieces slide onto each other with elastic force thereof.

3. An apparatus as claimed in claim 1, wherein a leftmost portion of said second elastic piece and a leftmost portion of said detent means are vertically aligned.

4. An apparatus as claimed in claim 1, further comprising a first groove formed an inside of said first elastic piece and a second groove formed an inside of said second elastic piece, wherein said first and second grooves are the same as said first and second elastic pieces in width.

* * * * *

UNITED STATES PATENT AND TRADEMARK OFFICE
CERTIFICATE OF CORRECTION

PATENT NO. : 5,240,239
DATED : August 31, 1993
INVENTOR(S) : Hyoung-Chae Kim

It is certified that error appears in the above-indentified patent and that said Letters Patent is hereby corrected as shown below:

Column 4,    Line 54,    Preceding "very", Delete "the" ;

Line 55,    Preceding "paper", Insert --the-- .

Signed and Sealed this

Eleventh Day of October, 1994

Attest:

BRUCE LEHMAN

*Attesting Officer*        *Commissioner of Patents and Trademarks*